United States Patent [19]

Millroy

[11] Patent Number: 4,616,440
[45] Date of Patent: Oct. 14, 1986

[54] FISHING LURE

[76] Inventor: John P. Millroy, 4300 NE. 18th Ave., Oakland Park, Fla. 33308

[21] Appl. No.: 618,270

[22] Filed: Jun. 5, 1984

[51] Int. Cl.⁴ .............................................. A01K 85/01
[52] U.S. Cl. ................... 43/42.12; 43/42.14; 43/42.36; 43/42.00
[58] Field of Search ............... 43/42.06, 42.12, 42.31, 43/42.14, 42.16, 42.46, 42.19, 42.2, 42.21, 42.36

[56] References Cited

U.S. PATENT DOCUMENTS

| | | |
|---|---|---|
| D. 217,603 | 5/1970 | Self . |
| D. 225,324 | 12/1972 | Royal . |
| D. 264,868 | 1/1982 | Beavers . |
| 360,339 | 3/1887 | Cooke ................... 43/42.36 |
| 667,257 | 2/1901 | Shakespeare ........... 43/42.14 |
| 1,073,199 | 9/1913 | Wilt ....................... 43/42.14 |
| 2,244,378 | 6/1941 | Turner ................... 43/42.14 |
| 2,665,516 | 1/1954 | Race . |
| 2,737,750 | 3/1953 | Pierce . |
| 3,012,358 | 12/1961 | Multanen . |
| 3,031,792 | 5/1962 | Swenson ................ 43/42.2 |
| 3,296,733 | 1/1967 | McLean . |
| 3,705,465 | 12/1972 | Charney ................. 43/42.31 |
| 3,905,147 | 9/1975 | Snipes . |
| 4,135,323 | 1/1979 | Esten . |
| 4,139,964 | 2/1979 | Pelletier ................. 43/42.19 |
| 4,416,080 | 11/1983 | Morrissette . |

*Primary Examiner*—Nicholas P. Godici
*Assistant Examiner*—Kurt Rowan
*Attorney, Agent, or Firm*—Lowe, Price, LeBlanc Becker & Shur

[57] ABSTRACT

A fishing lure comprises a rotor having vanes causing relative rotation thereof about a hollow shaft. The rotor is retained on the shaft between a forward cylindrical head and a trailing conical member stationarily fixed to opposite ends of the shaft. The lure head is flat and contains bores trapping air when the lure breaks the water surface. The entrapped air gradually releases when the lure submerges and travels along the sides of the lure. The vanes project outward into the path of the air to produce a stream of bubbles that attracts fish. Notches are formed in the head to establish a rotative force in the lure that resists the tendency of the head, tail and shaft assembly to rotate with the rotor. The fishing line extending through the hollow shaft is thus prevented from twisting.

4 Claims, 5 Drawing Figures

FISHING LURE

TECHNICAL FIELD

The present invention relates generally to fishing lures and, more particularly, to a trolling lure having features creating an effect of flashing light and a stream of bubbles to attract fish.

BACKGROUND ART

Artificial lures frequently employ features affecting both appearance and operation to simulate different types of natural bait attractive to fish. Various desired effects causing the lure to more closely resemble natural prey include creating an effect of flashing light, spraying or splashing water, or producing a stream of bubbles as the lure moves through water.

To produce the aforesaid effects, lures of which I am aware typically include a rotor rotated by action of water thereon. The rotor has reflective surfaces and is usually mounted on a shaft or leader connecting the lure to fishing line. A problem with this type of lure, however, is that the rotor tends to impart to the shaft through contact bearing surfaces therebetween a rotative force that in turn tends to twist the fishing line. Swivels connecting the lure to the line are usually insufficient to prevent line twisting.

One type of fishing lure constructed to prevent line twisting is disclosed in U.S. Pat. No. 3,296,733 to McLean wherein a rotor is retained on a spindle between a conical nosepiece and a rear body member respectively threaded to opposite ends of the spindle. To produce sound, the rearward edge of the rotor is serrated and engages a resiliently deflectable end of a spring wire attached to the rear body member. To resist the tendency of the body member to rotate, the body member is formed with a separate weighted lower segmental portion. While this prior art arrangement is somewhat effective to prevent line twisting, it requires the manufacture of a relatively complex lure body utilizing separate materials forming the upper portion and lower weighted portion of the body. Additionally, wave action against the sides of the lure tends to cause the lure body to oscillate about its axis. Depending upon surface conditions, the centrifugal force created by the aforesaid wave action in combination with the centrifugal force transmitted to the body member from the rotor serrations acting against the spring wire may be sufficient to overcome the downward force exerted on the body member by the weighted lower portion, causing the lure to rotate and twist the fishing line.

It is accordingly an object of the present invention, to provide a fishing lure having a rotor adapted to be rotated by action of water thereon as the lure is drawn through the water so that the rotor functions to create an effect of flashing light and a stream of bubbles to resemble natural bait without twisting the fishing line.

Another object of the invention is to provide a fishing lure having a simple and reliable built-in means for resisting the tendency of the rotor to rotate the lure.

Still another object is to provide a fishing lure that is inexpensive to manufacture and capable of easy assembly.

Yet another object is to provide a lure having structure conducive to entrapping a certain amount of air that passes through the rotor and escapes below the water surface as a trail of bubbles.

DISCLOSURE OF INVENTION

A fishing lure, according to the present invention, comprises a lure body having means for connecting the body to a fishing line and a fishing hook. A rotating means is mounted on the lure body for rotation about a longitudinal axis thereof. The rotating means tends to induce co-rotation of the lure body about the longitudinal axis due to transfer of rotative torque through contact bearing surfaces therebetween. To prevent rotation of the lure body and concomitant twisting of the fishing line, a member is fixed to the lure body to deflect water acting thereon so that the deflected water induces a force resisting rotation of the body. The body thereby remains stationary relative to its axis, preventing the fishing line from twisting.

In accordance with a preferred embodiment of the invention, the fishing lure preferably includes a spindle having a longitudinal axis and a rotor mounted on the spindle for rotation about the axis. The rotor includes plural vanes circumferentially arranged thereon so that water can impinge on the vanes to rotate the rotor in a first direction. To prevent co-rotation of the spindle and fishing line, the lure preferably includes a generally cylindrical head fixed to the forward end of the spindle. The head includes a notch formed with a generally flat side wall that is offset by a predetermined angle with respect to a plane extending coplanar with the longitudinal axis of the spindle and which intersects the side wall. Water flowing through the notch strikes the side wall to create a force resisting rotation of the spindle.

The head may include one or more bores arranged to trap air when the lure breaks the water surface. Upon submerging, water entering the bore gradually replaces air stored therein creating a stream of bubbles flowing along the sides of the lure to impinge on the rotor vanes.

Preferably, a cone shaped tail piece is fixed to the rearward end of the spindle and has a conical surface about which a hula skirt is secured. The conical surface tapers forwardly and terminates in a thin, annular surface against which the rotor rotates in low friction bearing contact.

In accordance with a second embodiment of the present invention, a second rotor can be mounted on the spindle downstream from the first rotor. The second rotor is identical to the first rotor except that the plural vanes circumferentially arranged thereon cause the second rotor to rotate in a direction opposite the first direction.

Additional objects, advantages and novel features of the invention will be set forth in detail in part in the description which follows and in part will become apparent to those skilled in the art upon examination of the drawing, or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
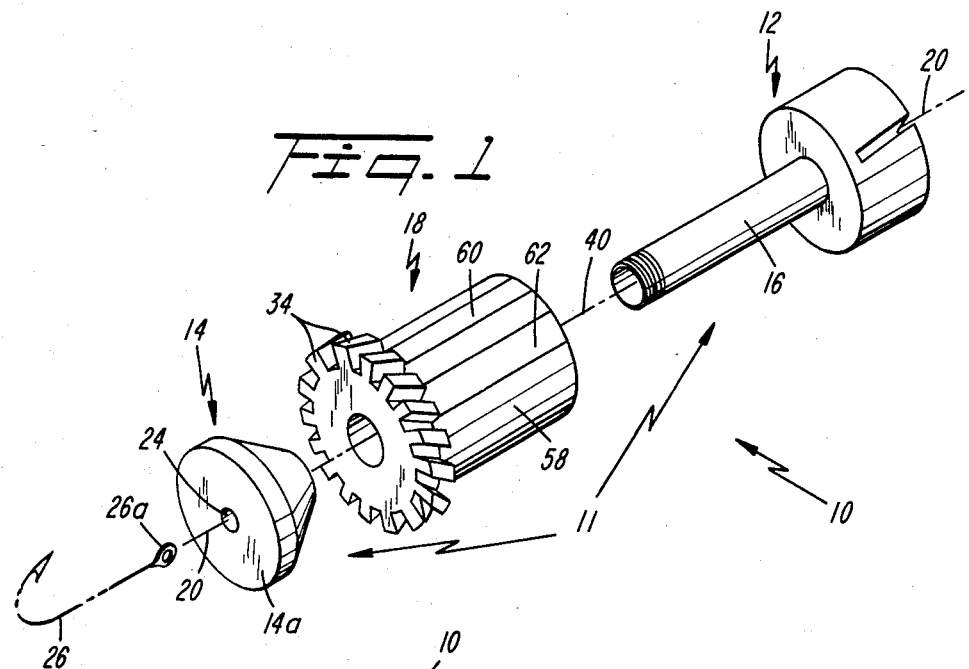
FIG. 1 is an exploded, perspective view of a first embodiment of the fishing lure according to the present invention.
Figures 2, 3:
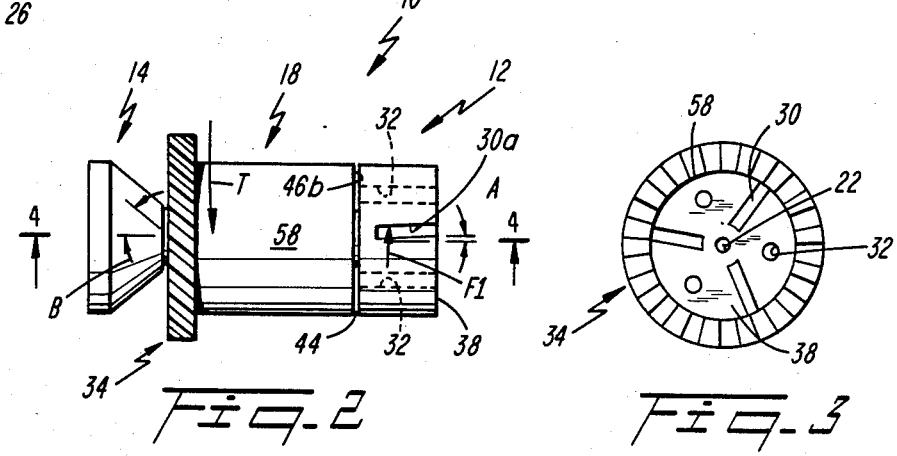
FIG. 2 is a side elevational view of the fishing lure of FIG. 1.
FIG. 3 is a front plan view of the fishing lure of FIG. 1.

Referring to FIG. 1, fishing lure 10 generally comprises a lure body 11 having a head 12 and tail 14 fixed to opposite ends of a hollow shaft or spindle 16. A rotor 18 is rotatably mounted on shaft 16 between the head and tail assembly of body 11. A fishing line 20 extends through shaft 16 which is in communication with central bores 22 and 24 respectively formed in body members 12, 14 with a hook 26 tied to the end of line 20: Hook eyelet 26A (or larger diameter than bore 24) abuts against a rear face 14a of tail 14 so that lure 10 is slidably retained on the line and may be trolled through the water. By virtue of its unique construction described below, lure 10, when drawn through the water, periodically breaks the surface causing air to become entrapped within notches 30 and bores 22 and 32 formed in head 12. Upon submerging, this air flows along the sides of lure 10 into rotor vanes 34 where it is both accelerated and agitated to create a powerful stream of bubbles attractive to game fish. The notches 30, apart from entrapping air, uniquely function to resist the tendency of lure body 11 to rotate with rotor 18, to prevent twisting of fishing line 20.

The forward end of shaft 16 is coaxially received in a countersunk hole 48 formed in a rear surface 46a of head 12 and is glued or otherwise nonrotatably fixed thereto. The rearward end of shaft 16 is preferably formed with threads 50 for threaded engagement with a countersunk hole 52 formed in a forward end of tail 14. With this arrangement, lure body 11 can be disassembled should replacement of rotor 18 become necessary, or if it is desired to fill the interior of shaft 16 with weight (e.g., lead shot) to vary the depth at which lure 10 is trolled.

Head 12 is preferably cylindrical and has a flat forward face 38 extending orthogonal to longitudinal axis 40 so that when lure 10 surfaces, water is violently thrown upward and forward by the face to produce a splashing effect. A series of bores 32 formed in head 12 communicate with face 38 to trap air when lure 10 surfaces. Upon submerging, water gradually forces the air through the bores 32 in the form of bubbles that flow into a gap 44 formed between rear and front surfaces 46a and 46b of head 12 and rotor 18, respectively. Upon exiting gap 44, these bubbles flow along sides of lure 10 into vanes 34 as described above.

Rotor 18 is of generally cylindrical construction having a central bore 56 of slightly greater diameter and the outside diameter of shaft 16 on which it is loosely mounted. A cylindrical side wall 58 extends along a major portion of rotor 18 and is of the same diameter as head 12. Vanes 34 are formed at equispaced circumferential intervals along the rear edge of rotor 18 and project radially outward from side wall 58 so that bubbles (i.e., escaping from notches 30 and from bores 32 though gap 44) and water flowing along the side wall can impinge on the vanes and be agitated thereby. Since side wall 58 rotates with vanes 34, light reflective material, such as reflective tape 60 or mirrors 62 (see FIG. 1 only), cover the sidewall so that it produces an effect of flashing light.

Tail 14 is preferably cone shaped and includes a conical side wall 54 around which may be secured a hula skirt or buck tail (not shown). Side wall 54 is forwardly tapered to establish with hole 52 a thin, annular contact bearing surface 56 against which rotor 18 rotates with only minimal frictional contact. As fishing lure 10 is drawn through the water by line 20, rotor 18 is urged rearwardly against contact bearing surface 56 of the tail. Although only a slight amount of friction is generated between the rotor and tail, this friction, in combination with the friction generated between the rotor and shaft, tends to impart a rotative torque T tending to induce co-rotation of lure body 11. Since fishing line 20 and hook 26 is in contact with the lure body, this induced rotation disadvantageously tends to twist the fishing line. To resist the tendency of lure body 11 to rotate with the rotor 18, each notch 30 has a wall 30a that is offset from plane extending coplanar with longitudinal axis 40 so so that water flowing through the notch impinges against this side wall imparting thereto a counter or deflection force component F1 equal to and resisting torque T and thereby rotation of shaft 16. Notch bottom wall 30b forms an angle of about 45° with surface 38 so that water flows smoothly through the notch to impinge in wall 30a to produce a constant deflection force F1.

Since notch side wall 30a need only be offset by an amount sufficient to resist the rotative torque generated by the aforesaid contact surfaces between rotor 18 with the shaft and tail pieces, the side wall need only be offset from the central longitudinal plane by an angle A of about 5° to 10° when vanes 34 are offset from the central plane by an angle B of about 45°.

Figures 4, 5:
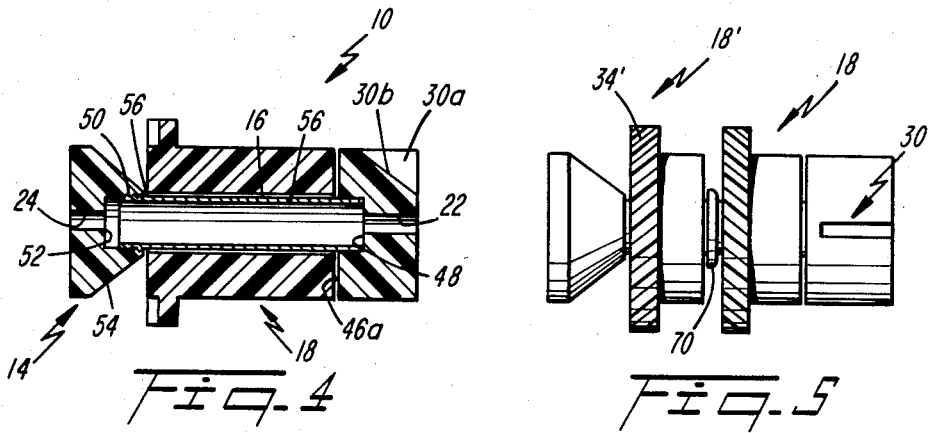
FIG. 4 is a sectional view taken along the line 4—4 of FIG. 2 showing the manner in which a rotor of the fishing lure is mounted on the lure body.
FIG. 5 is a side elevational view of a fishing lure constructed in accordance with a second embodiment of the present invention.

FIG. 5 is an illustration of a second embodiment of fishing lure 10 wherein a second rotor 18' is mounted in tandem on shaft 16. The rotor 18' is identical to rotor 18 except that vanes 34' are pitched to cause rotation of the second rotor in a direction opposite the first rotor. Rotors 18, 18' are spaced from each other by a spacer 70 fixed to the shaft so as to provide a slight amount of free play for each rotor in the axial direction. In the FIG. 5 embodiment of the invention, since rotors 18, 18' rotate in opposite directions, rotative torque transmitted by each rotor to lure body 11 is effectively cancelled, obviating the need for off-setting notches 30 in the manner described above.

Head 12, tail 14 and rotor 18 are preferably formed from clear plastic. Shaft 16 is preferably brass or aluminum.

The foregoing description of the preferred emboidments of the invention has been presented for purposes of illustration and description. It is not intended to be exhaustive or to limit the invention to the precise form disclosed, and obviously many modifications and variations are possible in light of the above teaching. The emboidments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A fishing lure, comprising:

(a) a spindle having a longitudinal axis;

(b) means for connecting a fishing line and hook to the spindle so that the fishing line draws the lure through the water;

(c) a first rotor mounted on said spindle for rotation about said axis, said rotor including a plurality of vanes circumferentially arranged thereon so that water can impinge on the vanes to rotate said rotor in a first direction, rotation of the rotor tending to induce co-rotation of the spindle and fishing line in the first direction; and (d) means for resisting rotation of the spindle, said means including a member fixed to the spindle that deflects water striking the member so that the deflected water creates a force (F) resisting rotation of the spindle in the first direction, said spindle thereby being stationary relative to its axis so that twisting of the fishing line is prevented;

(e) wherein said rotation resisting means includes a generally cylindrical body member fixed to the spindle to establish the forward end of the lure, the body member including a notch formed with a side wall that is offset by a predetermined angle as measured from a plane extending coplanar with said longitudinal axis and intersecting said side wall, whereby water flowing through the notch strikes the side wall to create said force F resisting rotation of the spindle and wherein said rotor is a generally cylindrical member having a cylindrical side wall with said vanes establishing the trailing end of the cylindircal member and projecting radially outward from the cylindircal side wall.

2. The lure of claim 1, wherein said cylindircal side wall has light reflective means for reflecting light during rotation about the longitudinal axis to attract fish.

3. The lure of claim 2, wherein said light reflective means includes mirrored faces on said cylindrical side wall.

4. A fishing lure, comprising:

(a) a spindle having a longitudinal axis;

(b) means for connecting a fishing line and hook to the spindle so that the fishing line draws the lure through the water;

(c) a first rotor mounted on said spindle for rotation about said axis, said rotor including a plurality of vanes circumferentially arranged thereon so that water can impinge on the vanes to rotate said rotor in a first direction, rotation of the rotor tending to induce co-rotation of the spindle and fishing line in the first direction; and (d) means for resisting rotation of the spindle, said means including a member fixed to the spindle that deflects water striking the member so that the deflected water creates a force (F) resisting rotation of the spindle in the first direction, said spindle thereby being stationary relative to its axis so that twisting of the fishing line is prevented;

(e) wherein said rotation resisting means includes a generally cylindrical body member fixed to the spindle to establish the forward end of the lure, the body member including a notch formed with a side wall that is offset by a predetermined angle as measured from a plane extending coplanar with said longitudinal axis and intersecting said side wall, whereby water flowing through the notch strikes the side wall to create said force F resisting rotation of the spindle, wherein said spindle is a hollow shaft having a front end attched to the cylindircal body in communication with a first bore extending through the body, and further including a tail piece fixed to the rear end of the hollow shaft, the tail piece including a second bore extending therethrough in communication with the hollow shaft, the fishing line being adapted to pass through the first and second bores and the hollow shaft to locate a fishing hook downstream and in contact with the tail piece, said fishing hook retaining the lure on the line, wherein said cylindrical body member has a generally flat, front face extending orthogonal to said longitudinal axis, three of said notches being peripherally formed in said space at equispaced intervals from each other about the first bore, and further including a pluarlity of third bores formed in said front face to trap air when the lure breaks the water and thereby produce air bubbles when the lure submerges, said air bubbles gradually leaking from the first and third bores into a gap formed between adjacent faces of the rotor and body member, the bubbles discharging from the gap flowing downstream towards the vanes to be agitated thereby.

* * * * *